United States Patent [19]

Wang

[11] Patent Number: 5,245,268
[45] Date of Patent: Sep. 14, 1993

[54] BATTERY CHARGER WITH CURRENT STABILIZER

[76] Inventor: Jason Wang, 3F, No. 7, Lane 453, Sec. 4, Pa-Te Rd., Taipei City, Taiwan

[21] Appl. No.: 870,055

[22] Filed: Apr. 15, 1992

[51] Int. Cl.[5] .............................................. H02J 7/10
[52] U.S. Cl. ........................................ 320/35; 320/22
[58] Field of Search ................... 320/20, 21, 22, 23, 320/24, 31, 32, 39, 40, 35, 36

[56] References Cited

U.S. PATENT DOCUMENTS

| | | | |
|---|---|---|---|
| 3,626,270 | 12/1971 | Burkett et al. | 320/40 X |
| 3,911,350 | 10/1975 | Swope | 320/22 |
| 3,969,665 | 7/1976 | Rowas | 320/35 |
| 4,075,504 | 2/1978 | Gnaedinger | 320/35 X |
| 4,240,022 | 12/1980 | Kilinskis et al. | 320/23 |
| 4,255,698 | 3/1981 | Simon | 320/35 |
| 4,297,630 | 10/1981 | Mullersman | 320/35 |
| 4,528,492 | 7/1985 | Inaniwa et al. | 320/36 |
| 4,712,055 | 12/1987 | Houser, Jr. | 320/35 |
| 4,829,259 | 5/1989 | Konopka | 320/21 |
| 5,043,559 | 8/1991 | Scott | 219/464 |

Primary Examiner—Steven L. Stephan
Assistant Examiner—Kristine Peckman
Attorney, Agent, or Firm—Wells, St. John, Roberts, Gregory & Matkin

[57] ABSTRACT

A battery charging device is used in charging a rechargeable battery load and is to be connected to an external dc power source. The battery charging device has a current stabilizer, which serially interconnects the power source and the battery load and which includes at least one posistor device, and a thermal circuit breaker, which is connected to the battery load and which breaks electrical connection between the battery load and the power source when the temperature of the battery load has risen to a predetermined level which indicates that the battery load has been fully recharged.

7 Claims, 6 Drawing Sheets

BATTERY CHARGER WITH CURRENT STABILIZER

BACKGROUND OF THE INVENTION

1. Field of the Invention

The invention relates to a battery charging device, more particularly to a battery charging device which can be used to recharge a wide variety of rechargeable batteries, which can be connected to different types of power sources and which can effect quick charging.

2. Description of the Related Art

Conventional electronic devices, such as mobile telephones, 8 mm video cameras and notebook computers, require a rechargeable battery pack which can supply electric power to the electronic devices when the latter are to be used outdoors. A battery charging device is needed so as to recharge the battery pack.

A main disadvantage of conventional battery charging devices is that most battery charging devices only permit recharging indoors. However, some electronic devices, such as notebook computers, are frequently used outdoors, and therefore, there is a need to permit charging of the battery packs using the power sources installed in vehicles (such as cars, trucks, boats, etc.). However, the voltage outputs of power sources installed in vehicles are unstable and may vary within a 10 volt range. Conventional battery charging devices are unable to provide a fairly constant output if the input thereto is unstable. Furthermore, quick charging is required since the charging time must be kept shorter than the traveling time. Another disadvantage of conventional battery charging devices is that they are not adapted for use in charging a wide variety of battery loads.

SUMMARY OF THE INVENTION

Therefore, the objective of the present invention is to provide a battery charging device which can be used to recharge a wide variety of rechargeable batteries, which can be connected to different types of power sources and which is capable of conducting a quick charging operation.

Accordingly, the preferred embodiment of a battery charging device of the present invention is used to charge a rechargeable battery load and is to be connected to an external dc power source. The battery charging device comprises a current stabilizer means, which serially interconnects the power source and the battery load and which includes at least one posistor means, and a thermal circuit breaker means, which is connected to the battery load and which breaks electrical connection between the battery load and the power source when the temperature of the battery load has risen to a predetermined level which indicates that the battery load has been fully recharged. The charging current output of the battery charging device can be maintained at desirable levels even though an unstable voltage input is present due to the characteristics of the posistor means.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
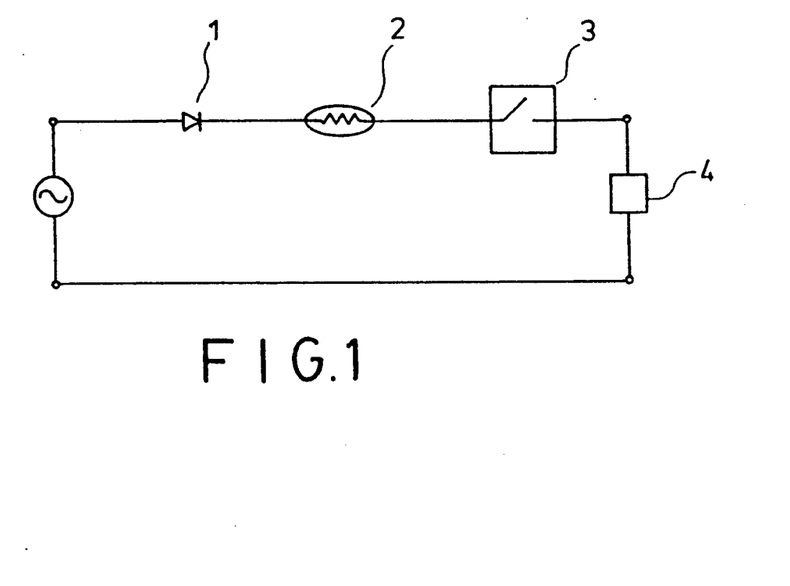
FIG. 1 is a schematic electrical circuit diagram of the first preferred embodiment of a battery charging device according to the present invention.

Referring to FIG. 1, the first preferred embodiment of a battery charging device according to the present invention is shown to comprise a current limiter (1), a current stabilizer (2), a thermal circuit breaker (3) and a rechargeable battery load (4).

The current limiter (1) is a diode which permits current flow in only one direction. The current stabilizer (2) is connected in series with the current limiter (1) and is preferably a posistor, which is a thermistor with a positive thermal coefficient. The current stabilizer (2) is connected in series with the circuit breaker (3). The temperature of the battery load (4) is used to control the opening action of the circuit breaker (3).

Figure 2:
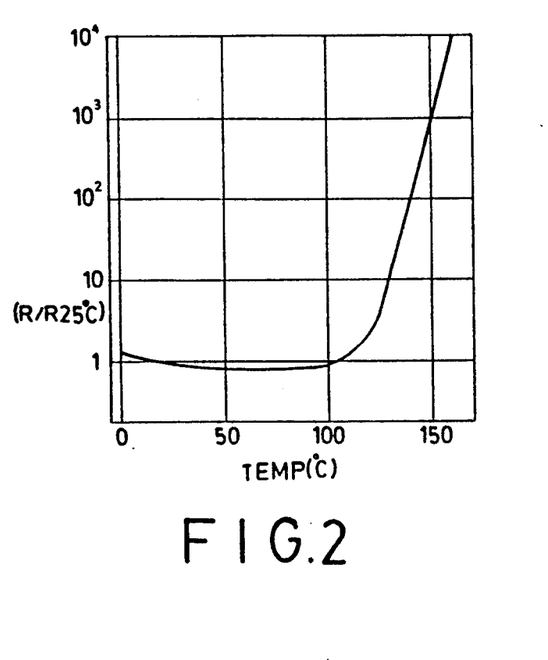
FIG. 2 illustrates the resistance/temperature characteristics of a posistor used in the first preferred embodiment.

FIG. 2 illustrates the resistance/temperature characteristics of a posistor. When the temperature of the posistor reaches a critical value, a steep rise in the resistance of the posistor occurs instantaneously. The resistance of the posistor is, however, fairly stable at temperatures below the critical value.

Figure 3:
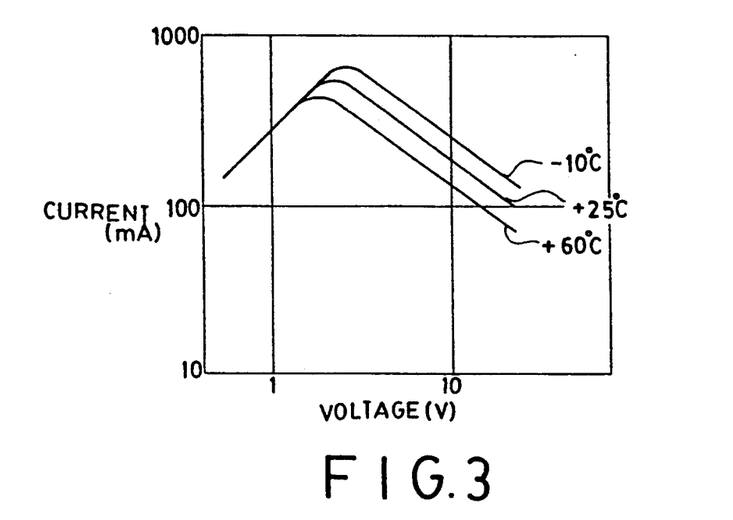
FIG. 3 illustrates the voltage/current characteristics of the posistor.

FIG. 3 illustrates the voltage/current characteristics of the posistor. The posistor generates heat when a voltage is applied thereto. When the heat generated and the heat dissipated by the posistor reach an equilibrium state, the static relationship between the applied voltage and the current flowing through the posistor when the temperature of the same is maintained at a fairly constant value may be represented by a linear function that is substantially similar in shape to an inverted letter "V."

Figure 4:
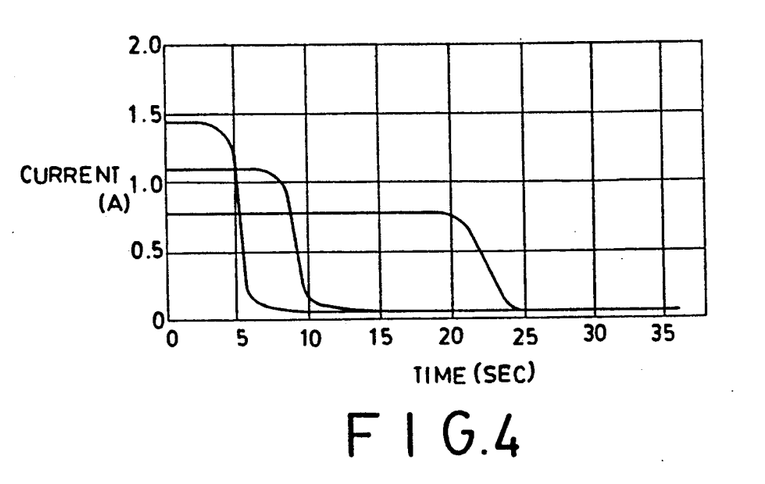
FIG. 4 illustrates the current/time characteristics of the posistor.

FIG. 4 illustrates the current/time characteristics of the posistor when the temperature of the posistor is not controlled. Note that when the current flowing through the posistor is relatively high, the temperature of the posistor reaches the critical value at a faster rate, thereby causing the posistor to cut off current flow therethrough at a shorter time.

Figure 5:
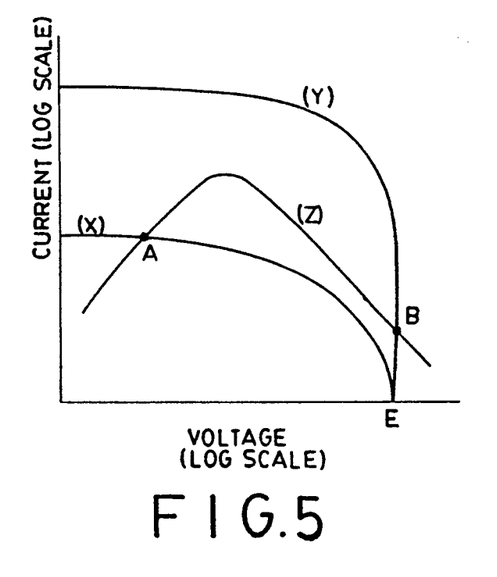
FIG. 5 illustrates the load lines of the circuit shown in FIG. 1 when operating under normal and abnormal conditions.

FIG. 5 illustrates the load lines of the circuit shown in FIG. 1 under normal and abnormal operating conditions. The load line (X) is obtained when the circuit is in the normal operating condition, while the load line (Y) is obtained when the circuit is in the abnormal operating condition. The curve (Z) is taken from the voltage/current relationship of the posistor as shown in FIG. 3. The load line (X) intersects the curve (Z) at point (A), while the load line (Y) intersects the curve (Z) at point (B). Note that while the difference in the voltages at the operating points (A, B) can reach a range of up to several hundred thousands [the voltages were plotted using the log scale], the difference in the currents at the same points was kept within a relatively smaller range (up to several hundreds). Therefore, it can be shown that a fairly constant current output can be obtained even if a 100% difference in the voltage inputs exists.

Note that the first preferred embodiment uses the resistance characteristics of the posistor so as to maintain the charging current at a fairly constant level, thereby preventing excessively high current from damaging the battery load. The first preferred embodiment is adapted for use with different kinds of electronic devices, such as mobile telephones and video cameras, and can be directly connected to the electronic device so as to effect charging of the battery load. The first preferred embodiment is also convenient to use and can be connected to different power sources, like the cigarette-lighter socket of a car.

A main drawback of the first preferred embodiment is that it cannot be used to charge a battery load quickly. This is because large amounts of current are required when executing a quick-charge operation. Such large amounts of currents will rapidly heat the posistor, thereby immediately causing a considerable increase in the resistance thereof and thus limiting the current flow therethrough.

Figure 6:
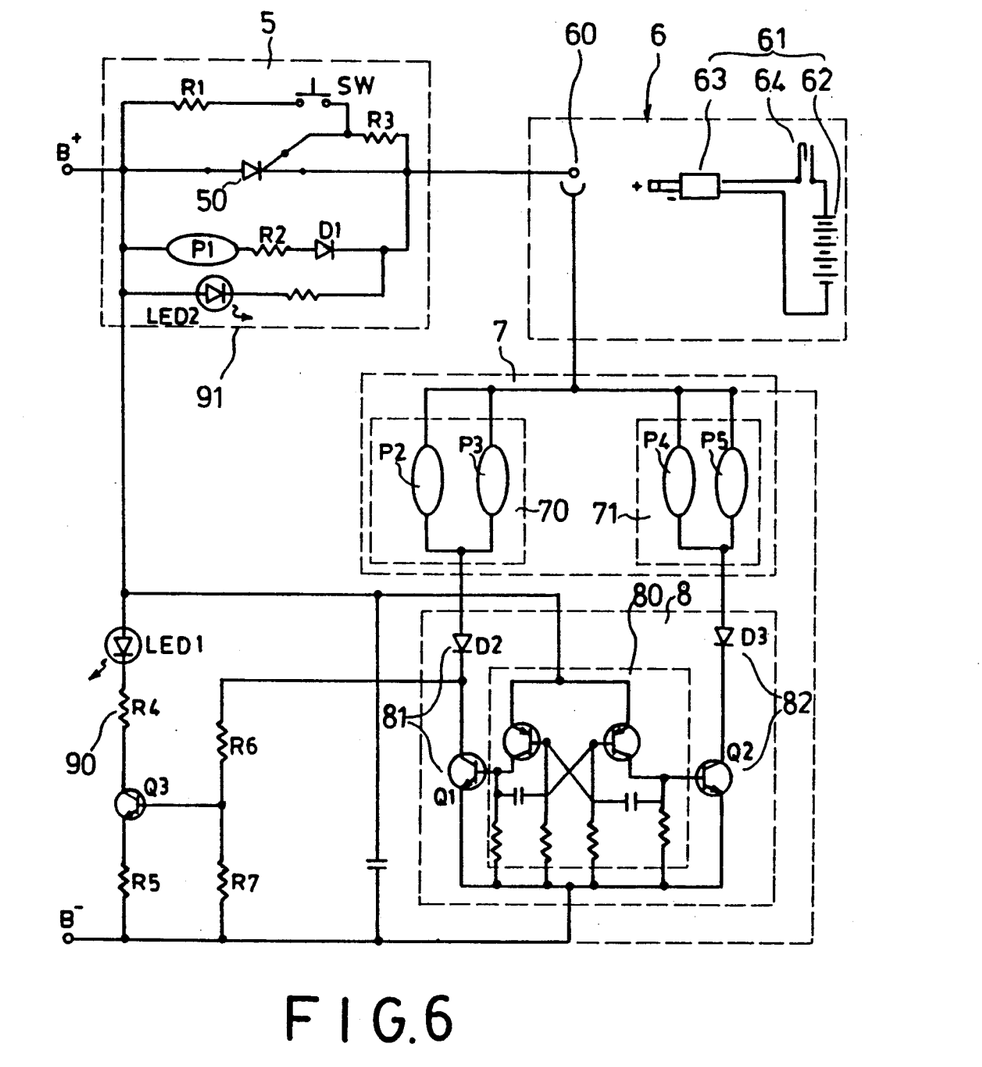
FIG. 6 is a schematic electrical circuit diagram of the second preferred embodiment of a battery charging device according to the present invention.

Referring to FIG. 6, the second preferred embodiment of a battery charging device according to the present invention is shown to comprise a control unit (5), a connector unit (6), a current stabilizing unit (7) and an oscillating switch means (8).

The control unit (5) includes a thyristor device, such as a silicon controlled rectifier (SCR) (50), which has an anode terminal connected to the positive terminal (B+) of a power source. A resistor (RI) and a switch (SW) are connected across the anode and gate terminals of the SCR (50). A first posistor (P1), a resistor (R2) and a diode (D1) are connected across the anode and cathode terminals of the SCR (50). A resistor (R3) is connected across the gate and cathode terminals of the SCR (50).

The connector unit (60) includes a jack (60) and a load circuit (61). The jack (60) has a first terminal which is connected to the cathode terminal of the SCR (50). The load circuit (61) is connected to a rechargeable battery (62) and includes a plug (63) which is adapted to be connected to the jack (60). The load circuit (61) further includes a thermal circuit breaker (64) which disconnects the battery (62) from the jack (60) when the temperature of the battery (62) reaches a predetermined value after having been fully recharged.

The current stabilizing unit (7) is connected to a second terminal of the jack (60) and includes first and second current stabilizers (70, 71). The first current stabilizer (70) includes second and third posistors (P2, P3), and the second current stabilizer (71) includes fourth and fifth posistors (P4, P5).

The oscillating switch means (8) comprises an oscillator circuit (80), a first switch unit (81) including a transistor (Q1) and a diode (D2), and a second switch unit (82) including a transistor (Q2) and a diode (D3). The first switch unit (81) is connected in series with the first current stabilizer (70). The second switch unit (82) is connected in series with the second current stabilizer (71). The oscillator circuit (80) has an input end connected to the positive terminal (B+) of the power source and output ends connected to the base terminals of the transistors (Q1, Q2). The emitter terminals of the transistors (Q1, Q2) are connected to the negative terminal (B-) of the power source.

The switch (SW) is closed if it is desired to use the second preferred embodiment in quickly charging a battery load. Closure of the switch (SW) causes the application of a bias voltage to the gate and cathode terminals of the SCR (50) so as to cause correspondingly the conduction of the SCR (50), thereby allowing a relatively large current to flow from the positive terminal (B+) of the power source to the connector unit (6), the current stabilizing unit (7) and to the oscillating switch means (8).

Note that relatively large amounts of current will cause rapid heating of the posistor. The second preferred embodiment thus employs two pairs of parallel-connected posistors so as to increase the heat dissipation area. Note also that when the temperature of the posistor reaches the critical level, a steep rise in the resistance of the same occurs, thereby reducing the current flow therethrough. The posistors employed in the second preferred embodiment are connected to an oscillating switch means which alternatingly interrupts current flow to the two posistor pairs so as to ensure that the temperatures of the posistors do not reach the critical level.

In order to reduce the charging time and obtain a more effective charging effect, the minimum resistances of the posistor pairs were selected so as to obtain a "tapering" current output. This will be described in greater detail in the succeeding paragraphs.

Figure 7:
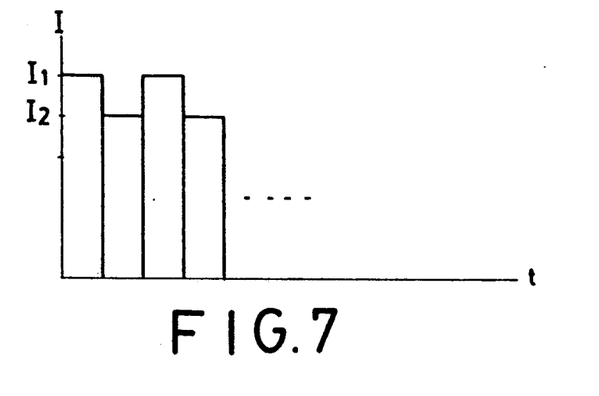
FIG. 7 is a timing diagram illustrating the charging current output of the second preferred embodiment when in a quick-charge mode.

FIG. 7 is a timing diagram which illustrates the current output of the connector unit (6) when the second preferred embodiment is operated in the quick-charge mode. The minimum resistance of the first current stabilizer (70) at temperatures below the critical value is chosen so that a current (I1) is present at the connector unit (6) when the first current stabilizer (70) is operated by the oscillating switch means (8). The minimum resistance of the second current stabilizer (71) at temperatures below the critical value is similarly chosen so that a current (I2) is present at the connector unit (6) when the second current stabilizer (71) is operated by the oscillating switch means (8). Note that since the current (I2) is less than the current (I1), the resistance of the first current stabilizer (70) is lower than that of the second current stabilizer (71). When the rechargeable battery (62) is connected to the jack (60), the oscillator circuit (80) initially causes the transistor (Q1) to conduct and the transistor (Q2) to be cut off. The current (I1) flows through the connector unit (6), the first current stabilizer (70) and through the first switch unit (81) so as to charge the rechargeable battery (62). After a time (t), wherein the temperature of the second and third posistors (P2, P3) almost reaches the critical value, the oscillator circuit (80) generates a pulse signal which causes the transistor (Q2) to conduct and the transistor (Q1) to be cut off. The current (I2) flows through the connector unit (6), the second current stabilizer (71) and through the second switch unit (82) so as to continue charging of the rechargeable battery (62). The oscillator circuit (870) then generates another pulse signal so as to return the transistors (Q1, Q2) to the former states when the temperature of the fourth and fifth posistors (P4, P5) almost reaches the critical value.

Referring once more to FIG. 6, a quick-charge detector (90) is connected across the positive and negative terminals (B+, B−) of the power source. The detector (90) includes a light emitting diode (LED1) and a transistor (Q3). A resistor (R4) connects the collector of the transistor (Q3) to the light emitting diode (LED1). A resistor (R5) connects the emitter of the transistor (Q3) to the negative terminal (B−) of the power source. The base terminal of the transistor (Q3) is connected to the junction of a resistor pair (R6, R7). The resistor pair (R6, R7) is connected across the collector of the transistor (Q1) and the negative terminal (B−) of the power source. When the second preferred embodiment is operating in the quick-charge mode, current flowing through the diode (D2) flows to the base terminal of the transistor (Q3), thereby causing the transistor (Q3) to conduct. Conduction of the transistor (Q3) causes current to flow through the light emitting diode (LED1) and thus causes the latter to glow.

The switch (SW) is opened if it is desired to use the second preferred embodiment in the normal charging mode. Opening of the switch (SW) places the SCR (50) in a cut off condition. Current from the positive terminal (B+) of the power source thus flows to the connector unit (6) via the first posistor (P1), the resistor (R2) and the diode (D1). Current through the connector unit (6) then flows through the current stabilizing unit (7) and the oscillating switch means (8)

Figure 8:
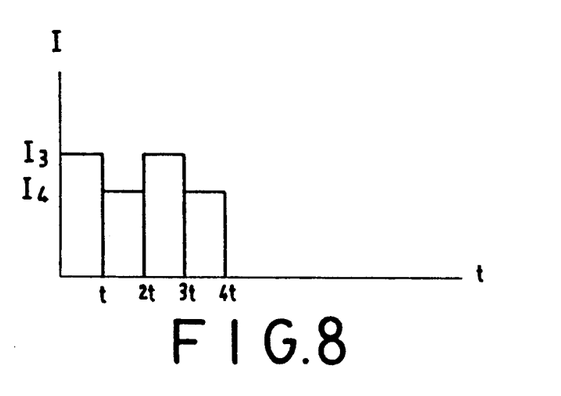
FIG. 8 is a timing diagram illustrating the charging current output of the second preferred embodiment when in a normal charging mode.

The maximum amount of current flow from the power source is under the control of the first posistor unit (P1). FIG. 8 is a timing diagram which illustrates the current output of the connector unit (6) when the second preferred embodiment is operated in the normal charging mode. The resulting timing diagram is substantially similar to that shown in FIG. 7 except that (I3)<(I1) and (I4)<(I2).

Referring once more to FIG. 6, a normal charging detector (91) is connected across the anode and cathode terminals of the SCR (50) and includes a light emitting diode (LED2). When the second preferred embodiment is operating in the normal charging mode, the SCR (50) is cut off, and current can therefore flow through the light emitting diode (LED2) and cause the latter to glow. The light emitting diode (LED1) does not glow at this stage because the bias voltage at the base terminal of the transistor (Q3) is insufficient to trigger the latter into conduction.

The second preferred embodiment is adapted for use with different types of rechargeable battery loads and can be connected to the cigarette-lighter socket of a car or to an ordinary household electrical outlet. Charging of the rechargeable battery load can therefore be conveniently accomplished at less time.

Figure 9:
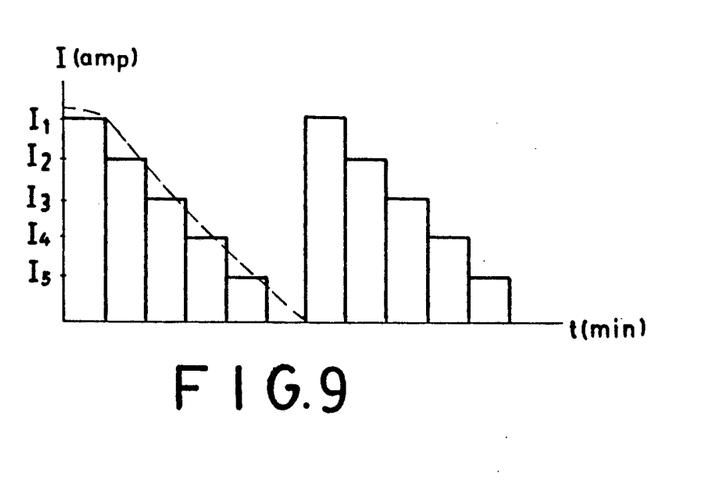
FIG. 9 is a timing diagram illustrating the charging current output of the third preferred embodiment of a battery charging device according to the present invention.

FIG. 9 is a timing diagram which illustrates the current output of the third preferred embodiment of a battery charging device according to the present invention. The current output of the third preferred embodiment is substantially similar to that shown in FIG. 7, except that the third preferred embodiment can supply five tapering current values (I1-I5).

Figure 10:
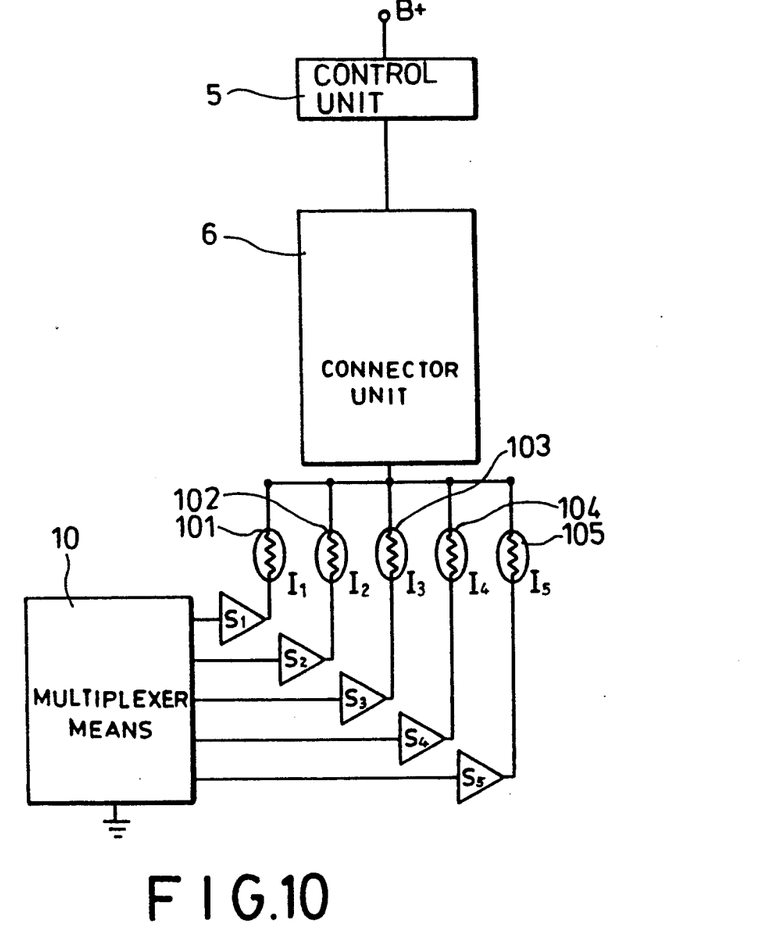
FIG. 10 is a simplified schematic circuit block diagram of the third preferred embodiment.

FIG. 10 is a schematic circuit block diagram of the third preferred embodiment. The third preferred embodiment comprises a control unit (5), a connector unit (6), a current stabilizer means which includes five posistors (101-105) and a multiplexer means (10). The multiplexer means (10) sequentially provides five control signals (S1-S5) to the posistors (101-105). The multiplexer means (10) disables a first one of the posistors (101-105) and subsequently enables a succeeding one of the posistors (101-105) so as to prevent the temperature of the posistors (101-105) from reaching the critical value. The posistors (101-105) have different minimum resistances which are chosen so as to permit the third preferred embodiment to provide a tapering current output to the rechargeable battery load. The tapering current output minimizes the occurrence of excessive internal heating of the battery load, which internal heating may eventually cause rapid degradation of the battery load.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A battery charging device for charging a rechargeable battery load, the battery charging device for connection to an external dc power source, the battery charging device comprising;

current stabilizer means, serially interconnecting the power source and the battery load, the battery load having a load temperature, said current stabilizer means, said plurality of posistor means having a posistor temperature;

means for disconnecting a first one of said posistor means from the power source and subsequently connecting a second one of said posistors means to the power source to prevent the posistor temperature of said plurality of posistor means from reaching a critical temperature; and thermal circuit breaker means connected to the battery load for preventing electrical connection between the power source and the battery load when the load temperature of the battery load has risen to a predetermined level which indicates that the battery load has been fully recharged.

2. The battery charging device as claimed in claim 1, wherein each of said posistor means comprises a plurality of posistor units connected in parallel.

3. The battery charging device as claimed in claim 1, wherein each of said posistor means has a minimum resistance which increases from the first one of said posistor means to the second one of said posistor means.

4. The battery charging device as claimed in claim 1, further comprising:

a control unit connected to the power source for controlling current flow therefrom, said control unit including:

a thyristor device connecting said current stabilizer means and the power source;

an additional posistor means connected across said tyristor device; and switch operated biasing means for setting said battery charging device selectively in a normal charging mode, wherein said thyristor device is cut off and current from the power source flows through said additional posistor means, and in a quick-charge mode, wherein a bias voltage is applied to trigger said thyristor device into conduction and to permit large amounts of current to flow from the power source.

5. The battery charging device as claimed in claim 1, wherein said disconnecting and connecting means includes an oscillating switch means for alternatingly connecting and disconnecting each of said posistor means from the power source.

6. The battery charging device as claimed in claim 4, further comprising a detector means for indicating if said battery charging device is operated in the normal charging mode and for indicating if said battery charging device is operated in the quick-charge mode.

7. The battery charging device as claimed in claim 1, wherein said disconnecting and connecting means comprises a multiplexer means connected to each of said posistor means.

* * * * *